Aug. 23, 1938.  A. DE WEAL  2,127,502
DENTAL FILM HOLDER
Filed Aug. 27, 1936  2 Sheets-Sheet 1
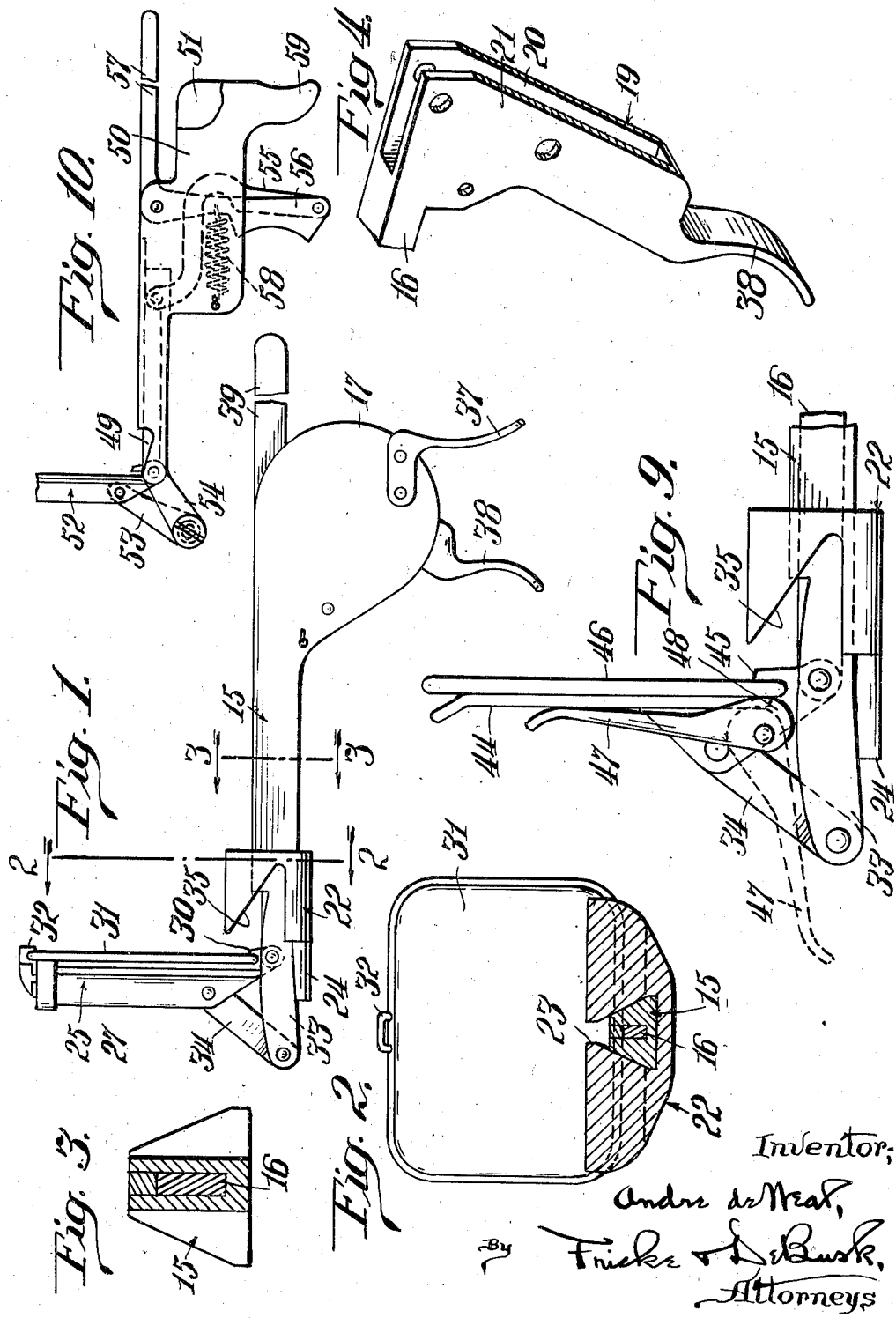
Inventor:
Andre de Weal,
By Fricke & DeBusk,
Attorneys Aug. 23, 1938.　　　A. DE WEAL　　　2,127,502
DENTAL FILM HOLDER
Filed Aug. 27, 1936　　　2 Sheets-Sheet 2
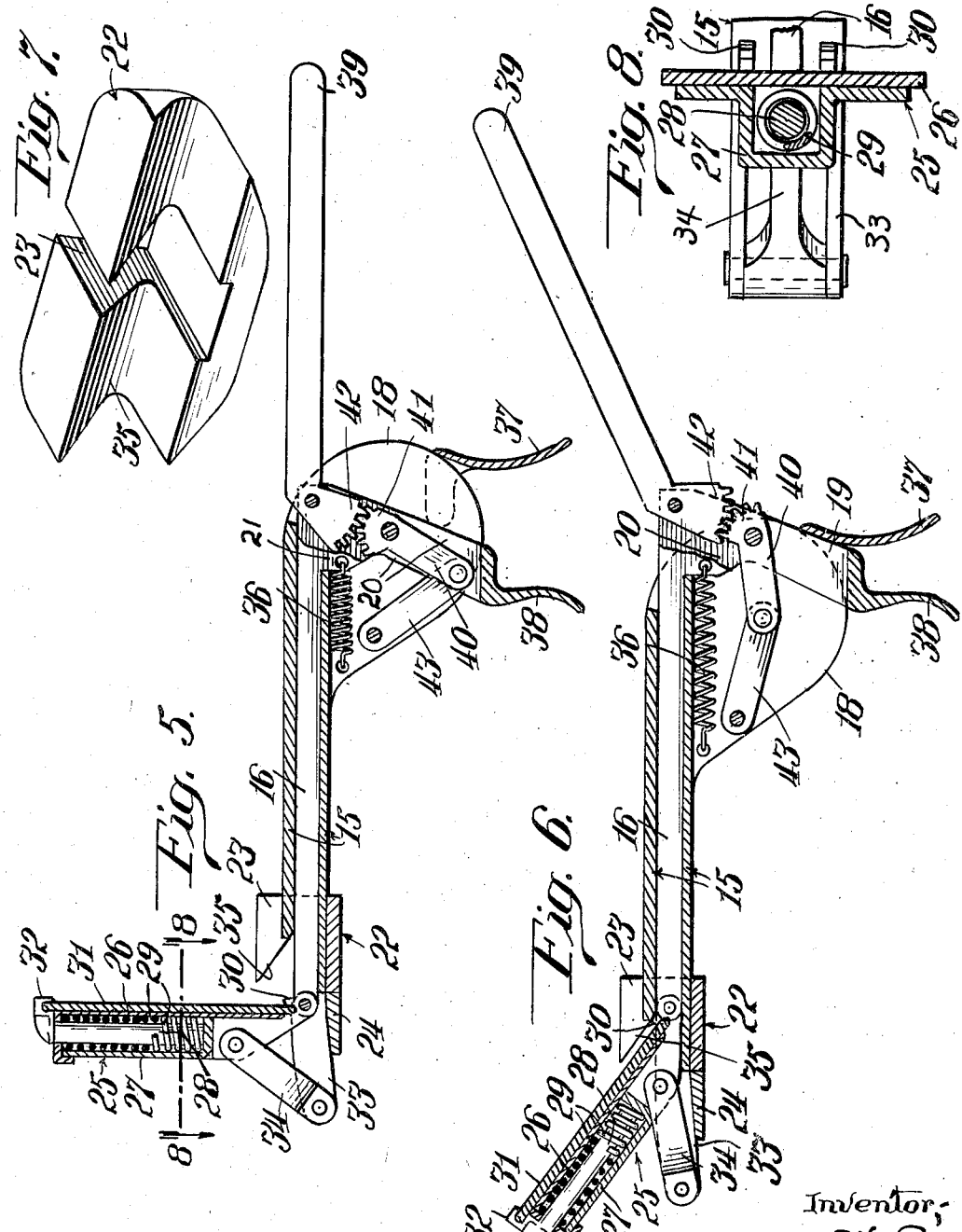
Inventor,
Andre de Weal
By Fricke & DeBusk,
Attorneys.

Patented Aug. 23, 1938

2,127,502

UNITED STATES PATENT OFFICE 2,127,502

DENTAL FILM HOLDER

Andre de Weal, New York, N. Y.

Application August 27, 1936, Serial No. 98,257

19 Claims. (Cl. 250—34)

My invention relates to devices for holding X-ray films or packs in position in a patient's mouth for an exposure and to means in connection therewith for indicating the position in which an X-ray tube should be placed for obtaining on the film the desired image of the tooth or other part being radiographed. Heretofore, skillful X-ray operators have attempted to direct the central beam from the X-ray tube along a path at right angles to the plane which bisects the angle between the plane of a tooth and the plane of a film placed at the inside face of the tooth in as near parallelism therewith as the conformation of the patient's mouth will permit, whereby the image of the tooth on the film shall be kept as nearly as possible of the same dimensions as the tooth. It is one of the objects of my invention to provide an improved arrangement of means for indicating mechanically outside of the mouth the position at which the source of the ray should be placed for attaining the desired results.

It is another object of my invention to provide an improved form of base member adapted by its engagement between the upper and the lower teeth of the patient to hold the device as a whole in the desired operative position, such base member being preferably formed of wood or other material affording little resistnce to the passage of X-rays therethrough and being preferably easily removable from cooperative position with respect to the other parts of the device. It is another object of my invention to provide an improved form and arrangement of linkwork connections between the film holder and the pointer means by which the desired ratio of angular movement of one with respect to the angular movement of the other is maintained. It is another object of my invention to provide an improved form of means for securing the film in either of two desired positions on the film holder so as to be easily and quickly placed in position thereon, and then easily and quickly removed from position after exposure.

It is another object of my invention to improve devices of this type in sundry details hereinafter pointed out. The preferred means by which I have accomplished my several objects are illustrated in the drawings and are hereinafter specifically described. That which I believe to be new and desire to cover by Letters Patent is set forth in the claims.

In the drawings,—

Fig. 1 is a side face view of the preferred form of my improved device, with a film in position on the film holder;

Fig. 2 is a vertical cross sectional view taken at line 2—2 of Fig. 1;

Fig. 3 is a vertical cross sectional view taken at line 3—3 of Fig. 1;

Fig. 4 is a perspective view of the rear end portion of a slide bar member forming a part of my improved apparatus;

Fig. 5 is a vertical sectional view through the center of my improved device longitudinally thereof;

Fig. 6 is a view similar to Fig. 5 but showing a changed position of certain of the parts;

Fig. 7 is a perspective view of the base member of my improved device;

Fig. 8 is a horizontal sectional view taken at line 8—8 of Fig. 5;

Fig. 9 is a view corresponding to the left-hand portion of Fig. 1 on an enlarged scale but showing a modified form of arrangement; and Fig. 10 is a side face view of a modified form of my device, broken away at certain points for clearness of illustration, and with the film and base member omitted.

Referring now to Figs. 1 to 8, in which corresponding parts are indicated by the same reference characters, 15 indicates an elongated framework having a slideway therein within which a link 16 is slidably mounted. At its forward end, the frame 15 comprises two transversely spaced plates 17 and 18 between which a downward extension 19 of the link 16 is movable, such downward extension 19 comprising in turn two spaced plate portions 20 and 21, as is best shown in Fig. 4. The arrangement is such that the link 16 and the downward extension 19 are slidable longitudinally of the framework comprising the portions 15, 17 and 18.

As is best shown in Fig. 3, the frame 15 at an intermediate portion is in the form of a bar having substantially parallel sides, while at a point a short distance toward the rear the bar is considerably broadened at its base with its sides converging upwardly, as is clearly shown in Fig. 2. This arrangement provides for a ready mounting of a base member 22 removably in position, such base member being provided with a dove-tailed transverse notch 23 across its top face of such shape as to fit snugly about the frame 15 as is shown in Fig. 2. The block comprising the base member 22 is to be placed in position at the narrow portion of the frame and is then slid backwardly toward the left in Fig. 1 into dove-tailed engagement with the frame as shown in Figs. 1 and 2. A block 24 carried by the frame serves to limit the movement of the base member into position.

Upon the rear end of the link 16, I have pivotally mounted a film holder 25, such film holder in the arrangement shown comprising a plate 26 and a housing 27 mounted on its rear face. Within the housing 27 I have mounted a slide bar 28 which is normally held in lowered position within the housing by a coiled spring 29. At its lower end portion adjacent to its pivotal connection with the link 16, the film holder is provided with hook means 30 adapted to engage the lower edge of a film pack 31, the upper edge of the film pack being engaged by hook means 32 mounted on the upper end of the slide bar or plunger 28. The arrangement is such that a film pack 31 can be very quickly and easily secured removably in position in either of its two operative positions so as to be held firmly in position.

At the rear beyond the base member 22, the frame 15 terminates in spaced arms 33 between which I have pivotally mounted the lower end of an arm 34. The opposite end of the arm 34 is pivotally connected with the film holder below the slide bar portion 28 thereof. The arrangement is such that when the link 16 is moved toward the right in Fig. 5 from the position shown therein to the position shown in Fig. 6, the film holder is caused to swing backwardly with respect to the framework so as to give the film pack 31 an edgewise sliding movement into a notch 35 provided across the rear face of the base member 22. As is clearly shown in Figs. 5 and 6, a coiled spring 36 is provided connected at its rear end portion to the frame 15 and connected at its forward end with the downward extension 19 of the link 16, the spring serving thus normally to hold the link 16 at the limit of its movement toward the left in Fig. 5. As is also clearly shown in said Fig. 5 I have provided a finger piece 37 on the plates 17 and 18 of the frame, and a finger piece 38 on the downward extension 19 of the link, such finger pieces being normally in spaced relation as shown in Fig. 5. When the finger pieces 37 and 38 are moved toward each other by a slight pressure thereon for overcoming the force of the spring 36, the link 16 is moved from the position shown in Fig. 5 to the position shown in Fig. 6, serving to cause the film 31 to have a combination swinging and edgewise sliding movement into the notch 35 of the base member 22.

When the device is to be employed in the mouth of a patient, the device is held by the operator by means of the finger pieces 37 and 38 with the film holder and film tilted backwardly to the limit of their motion as shown in Fig. 6. The device is then inserted in the patient's mouth and the base member 22 is placed carefully in position between the upper and the lower teeth of the patient, with the face of the base member at opposite sides of the notch 23 ordinarily located at right angles to the longitudinal axis of the tooth to be radiographed, the engagement of the base member between the teeth being effective for holding the device as a whole in position when the operator releases the finger pieces. The spring 36 then causes the film holder and the film to swing in clockwise direction from the position as shown in Fig. 6 as far as the conformation of the mouth will permit, so as to bring the film pack into as nearly as possible parallel position with respect to the tooth to be radiographed.

For providing the desired indication on the outside of the mouth as to the final operative position of the film pack within the mouth, I have provided a pointer 39 pivotally mounted at its rear end between the plates 20 and 21 of the link 16. Below the pointer 39, I have pivotally mounted a lever 40 upon the extension 19, the lever 40 and the link 39 being operatively connected together by means of segmental gears 41 and 42 formed with the lever and the pointer respectively. In the arrangement shown, the radius of the gear 41 is just half as great as the radius of the gear 42. The lever 40 is also connected with the frame 18 by means of an arm 43 one end of which is pivotally connected with the frame and the other end pivotally connected with the lever. In the arrangement shown, the arms 34 and 43 are of the same length, and the length of the portion of the lever 40 between its pivotal connections with the arm 43 and the downward extension 19 is the same as the distance between the pivotal connections of the film holder with the link 16 and the arm 34. The result of this arrangement is that the pointer 39, as it swings in the same direction as the film holder 25, is swung through just half as great an angle as that through which the film holder swings. The arrangement is also such that when the parts are in normal position as shown in Fig. 5 the pointer 39 stands in right angled relation to the holder 31. As a result of this arrangement, the pointer 39 is a perfectly safe guide from a practical standpoint as to the position in which the X-ray tube is to be placed. When the X-ray tube is placed in position as indicated by the pointer 39, the operator is assured that the ray from the tube to the film is at right angles to the plane which bisects the angle between the plane of the tooth and the plane of the film, as is desired for providing a true-sized image of the tooth on the film.

With the film slid edgewise into the transverse notch 35 of the base member so as to bring the edge of the film into position between the biting edges of the teeth engaging the base member, the operator is assured that the image of the tooth will be located complete within the margins of the film and in substantially centered position on the film. This is very often of great importance with respect to the proper interpretation of the radiograph. In order to provide a minimum of shadow in connection with such image, I have made the base member 22 preferably of wood so as to provide easy passage of the ray through the block.

In the arrangement shown in Fig. 9, a modified form of film holder is provided comprising a plate 44 which is pivotally mounted upon the link 16, such plate being provided with an upstanding lug 45 in spaced relation to its front face so as to provide for the insertion of a film pack 46 into position as shown in Fig. 9. Upon the rear face of the plate 44, I have mounted a yoke lever 47 having eccentric portions 48 at the lower ends of its opposite legs adapted in the position of the lever as shown in solid lines to press the lower edge of the film 46 against the upstanding lug 45 for holding the film securely in position. When the lever 47 is swung downwardly and backwardly as shown in dotted lines, the eccentrics 48 are moved out of engagement with the film 46 so as to permit its ready removal.

In the arrangement shown in Fig. 10, a link 49 is slidably mounted in an elongated framework comprising two side plates 50 and 51 preferably of sheet metal. Upon the rear end of the link 49 (at the left in said Fig. 10), a film holder 52 is pivotally mounted, such holder in the arrangement shown being substantially like the film holder 25 above described. This film holder 52 is pivotally connected by means of an arm 53 with the end portions of arms 54 fixedly carried by the plates 50 and 51. The arrangement is such that upon movement of the link 49 toward the right in Fig. 10 the film holder is caused to swing backwardly and at the same time to slide forwardly, just as is described in connection with the film holder 25 above.

The side plates 50 and 51 of the framework are arranged for receiving and holding a base member 22 in position in the same manner as is described above in connection with the device shown in Fig. 1, whereby the device as a whole can be held in position in a patient's mouth by the engagement of the teeth with the base member 22 for supporting a film in operative relation to a tooth as above described.

At its forward end, the slide link 49 is pivotally connected with one end of a link 55 which at its opposite end is pivotally connected with one of the arms 56 of a bell crank lever pivotally mounted between the frame plates 50 and 51, the other arm 57 of said bell crank lever being directed forwardly substantially in alignment with the link 49. The arm 56 of the bell crank lever extends in the opposite direction from the elongated frame from that in which the film holder 52 extends. A coiled spring 58 connected at one end between the plates 50 and 51 and connected at its opposite end with the arm 56 of the bell crank lever serves to hold the parts normally in the position as shown in Fig. 10, with the slide link 49 at the limit of its rearward movement so as to hold the film holder 52 in substantially right angled relation to the framework comprising the plates 50 and 51 and with the arm 57 in substantially right angled relation to the film holder 52. At their forward ends, the plates 50 and 51 are provided with finger pieces 59 for cooperation with the arm 56 of the bell crank lever for holding the device as a whole in operative position.

In the arrangement as illustrated in Fig. 10, the proportions of the parts are such that when the arm 56 is swung toward the finger pieces 59 for giving the arm 57 a swinging movement, the slide link 49 is moved forwardly through the medium of the link 55 serving to give the film holder 52 a backward swinging movement through substantially twice as great an angle as that through which the arm 57 swings, the operation of the device of said Fig. 10 being thus seen to be similar to that of the device of Fig. 1 as above set forth.

My improved arrangement as above described is such as to be capable of being sterilized very quickly and easily. If the operator desires, the wooden block comprising the base member 22 can be discarded after a single use. I have found, however, in practice that such blocks made of a good quality of wood can be very thoroughly and satisfactorily sterilized if the operator desires to use such parts a second time. I have found in practice that my device operates very satisfactorily from the standpoint of X-ray results. The arrangement is such that the device is very readily inserted into the mouth with a minimum of interference and a minimum of contact with the walls of the mouth. I have found particularly that the contact with the palate is very limited, so as to enable me with my improved device to get much more satisfactory results than can be obtained when the patient is expected to hold the film in position by the pressure of one or more fingers.

My improved apparatus is shown in the drawings in position for use for making an X-ray exposure of an upper tooth. It will be understood that for an exposure of a lower tooth the device as a whole will be inverted without affecting in any way the operation of the device. It will be understood also that if desired the film pack can be bent by the operator for enabling the film to approach more closely to the plane of the tooth being radiographed. It will be understood also that the film may be placed upon the holder out of centered position transversely thereon if such expedient seems necessary or advisable for the proper positioning of the film with respect to the tooth to be radiographed.

While I prefer to employ the form of device as shown and as above described, it is to be understood that my invention is not limited to the arrangements shown except so far as the same may be covered by detailed claims thereon, it being understood that changes might well be made in the form and arrangement of the parts without departure from my invention.

I claim:—

1. In a device of the type described, the combination of an elongated frame, means for holding said frame in fixed position with respect to a patient's mouth, a film holder swingingly mounted on a pivot movable along said frame at one end portion thereof, a pointer swingingly mounted in position at the opposite end portion of said frame, and linkwork means movably mounted between said film holder and said pointer actuated by a swinging movement of said film holder for causing said pointer means to swing in the same direction but through a smaller arc.

2. In a device of the type described, the combination of an elongated frame, means for holding said frame in fixed position with respect to a patient's mouth, a link slidably mounted on said frame so as to move longitudinally thereof, a film holder pivotally mounted on one end of said link, means actuated by an operative stroke of said link in one direction to give said film holder a swinging movement with respect to the link, a pointer swingingly mounted in position at the opposite end of said frame, and means actuated by said operative stroke of said link to give said pointer a swinging movement in the same direction as that of the film holder but through a smaller arc.

3. In a device of the type described, the combination of an elongated frame, a film holder swingingly mounted on a pivot movable along said frame at one end portion thereof, a pointer swingingly mounted in position at the opposite end portion of said frame, linkwork means movably mounted between said film holder and said pointer actuated by a swinging movement of said film holder for causing said pointer means to swing in the same direction but through a smaller arc, yielding means connecting said movable parts with said frame tending to hold said parts at one limit of said movement, and finger pieces carried by said frame and said movable parts respectively in spaced relation to each other for moving the parts against the action of said yielding means.

4. In a device of the type described, the combination of an elongated frame, a link slidably mounted on said frame so as to move longitudinally thereof, a film holder pivotally mounted on one end of said link, means actuated by an operative stroke of said link in one direction to give said film holder a swinging movement with respect to the link, a pointer swingingly mounted in position at the opposite end portion of said frame, means actuated by said operative stroke of said link to give said pointer a swinging movement in the same direction as that of the film holder but through a smaller arc, yielding means operatively connecting said link with said frame so as to oppose movement of the link in one direction, and finger pieces normally held by said yielding means in spaced relation to each other for moving said link longitudinally of the frame against the action of said yielding means.

5. In a device of the type described, the combination of a frame, means for holding said frame in fixed position with respect to a patient's mouth, a film holder swingingly mounted on a pivot member movable along said frame at one end portion thereof, means for moving said pivot member with respect to said frame, and means adapted upon a movement of said pivot member along the frame to give said film holder a swinging movement with respect to the frame.

6. In a device of the type described, the combination of a frame comprising a base member notched transversely across its back face, a film holder for supporting a film on edge in rear of said base member, and means for giving said film holder a combination swinging and sliding movement for carrying a film mounted thereon edgewise into the notch of the base member.

7. In a device of the type described, the combination of a frame comprising a base member of material permeable to X-rays removably mounted in position and having a notch extending across its back face transversely of the frame, a film holder swingingly mounted on a pivot member movable along said frame in rear of said base member, means for moving said pivot member with respect to said frame, and means adapted upon a movement of said pivot member along the frame to move the film holder for giving a film mounted thereon a combination swinging and edgewise sliding movement into the notch of the base member.

8. In a device of the type described, the combination of a frame comprising a bar and a base member having a dove-tailed connection with the bar and formed of material permeable to X-rays, with a notch extending deeply thereinto across its back face, a film holder swingingly mounted on a pivot member movable along said frame in rear of said base member, means for moving said pivot member with respect to said frame, and means adapted upon a movement of said pivot member along the frame to move the film holder for giving a film mounted thereon a combination swinging and edgewise sliding movement into the notch of the base member.

9. In a device of the type described, the combination of a frame comprising a bar and a block of wood having a dove-tailed notch across its top face for holding the block removably in position on a correspondingly shaped portion of the bar and having a second notch extending deeply into the block across its back face, a film holder for supporting a film on edge in rear of said block, and means for giving said film holder a combination swinging and sliding movement for carrying a film mounted thereon edgewise into the transverse notch of said block.

10. In a device of the type described, the combination of an elongated frame, a link slidably mounted on said frame so as to move longitudinally thereof, a film holder pivotally mounted on one end portion of said link, an arm pivotally connected at one end with said film holder and at its opposite end with said frame so as to cause said film holder to swing backwardly when the link is moved forwardly, a pointer swingingly mounted on the opposite end portion of said link, a second arm pivotally mounted at one end on said frame adjacent to said link, and operative connections between said second arm and said pointer adapted on a sliding movement of the link to swing the pointer in the same direction as that in which the film holder swings but through a smaller arc.

11. In a device of the type described, the combination of an elongated frame, a link slidably mounted on said frame so as to move longitudinally thereof, a film holder pivotally mounted on one end portion of said link, an arm pivotally connected at one end with said film holder and at its opposite end with said frame so as to cause said film holder to swing backwardly when the link is moved forwardly, a pointer swingingly mounted on the opposite end portion of said link, a lever pivotally mounted on said link adjacent to said pointer, means operatively connecting said lever with said pointer for causing them to swing in unison, and a second arm pivotally mounted at one end on said frame and pivotally connected at its opposite end with said lever for causing the pointer to swing in the same direction as that in which said film holder swings but through a smaller arc.

12. In a device of the type described, the combination of an elongated frame, a link slidably mounted on said frame so as to move longitudinally thereof, a film holder pivotally mounted on one end portion of said link, an arm pivotally connected at one end with said film holder and at its opposite end with said frame so as to cause said film holder to swing backwardly when the link is moved forwardly, a pointer swingingly mounted on the opposite end portion of said link, a lever pivotally mounted on said link adjacent to said pointer, segmental gears operatively connecting said lever with said pointer for causing them to swing in unison, and a second arm pivotally mounted at one end on said frame and pivotally connected at its opposite end with said lever for causing the pointer to swing in the same direction as that in which said film holder swings but through a smaller arc.

13. In a device of the type described, the combination of a frame, a film holder swingingly mounted on said frame, hook means on said film holder adjacent to its axis, other hook means slidably mounted on said film holder adapted by cooperation with said first named hook means to hold a film removably in position on the film holder, and means for giving said film holder a swinging movement with respect to said frame.

14. In a device of the type described, the combination of a frame, a film holder swingingly mounted on said frame, hook means on said film holder adjacent to its axis, a bar slidably mounted on said film holder so as to move toward and from the axis thereof, yielding means for holding said bar normally at the limit of its movement toward the axis of the holder, hook means carried by said bar adapted by cooperation with said first named hook means to hold a film removably in position on the film holder, and means for giving said film holder a swinging movement with respect to said frame.

15. In a device of the type described, the combination of a frame, a film holder in the form of a plate swingingly mounted on said frame, a lug carried by said plate in spaced relation thereto adjacent to the axis of the plate, a lever pivotally mounted on said plate and having eccentric surface portions adapted when the lever is swung toward the plane of the plate to press a film firmly against said lug for holding the film securely in position on the plate, and means for giving said film holder a swinging movement with respect to said frame.

16. In a device of the type described, the combination of an elongated frame, a film holder pivotally mounted on a transverse axis at one end portion of said frame, a pointer pivotally mounted on a transverse axis at the opposite end portion of said frame, a link slidably mounted on said frame so as to move longitudinally thereof, and means actuated by a forward movement of said link to give said film holder a backward swinging movement and to give said pointer a swinging movement in the same direction but through only about half as great an arc.

17. In a device of the type described, the combination of an elongated frame, a link slidably mounted on said frame so as to move longitudinally thereof, a film holder pivotally mounted on a transverse axis on the rear end portion of said link, means actuated by a forward movement of said link to give said film holder a combination backward swinging and forward sliding movement, a pointer pivotally mounted on a transverse axis at the forward end portion of said frame, and means actuated by a forward movement of said link to give said pointer a swinging movement in the same direction as that of said film holder but through only about half as great an arc.

18. In a device of the type described, the combination of an elongated frame, a film holder pivotally mounted on a transverse axis at one end portion of said frame, a pointer pivotally mounted on a transverse axis at the opposite end portion of said frame, a link slidably mounted on said frame so as to move longitudinally thereof, means effectively connecting said link with said film holder for giving the film holder a backward swinging movement upon a forward movement of the link, an arm connected with said pointer in angular relation thereto so as to swing therewith, and means adapted by pivotal connection at one end with said first named link and by pivotal connection at its opposite end with said arm to give said pointer a swinging movement in the same direction as that of said film holder but through only about half as great an arc.

19. In a device of the type described, the combination of an elongated frame, a link slidably mounted on said frame so as to move longitudinally thereof, a film holder pivotally mounted on a transverse axis on the rear end portion of said link, means actuated by a forward movement of said link to give said film holder a combination backward swinging and forward sliding movement, a bell crank lever pivotally mounted on a transverse axis at the forward end portion of said frame with one arm extending forwardly and the other arm extending from said frame in the opposite direction from that in which said film holder extends, and a second link pivotally connected at one end with said first named link and pivotally connected at its opposite end with said other arm of the bell crank lever.

ANDRE DE WEAL.